Oct. 18, 1966 D. P. SHILEY 3,279,190
INVESTMENT CAST ROCKET
Filed July 27, 1962 2 Sheets-Sheet 1
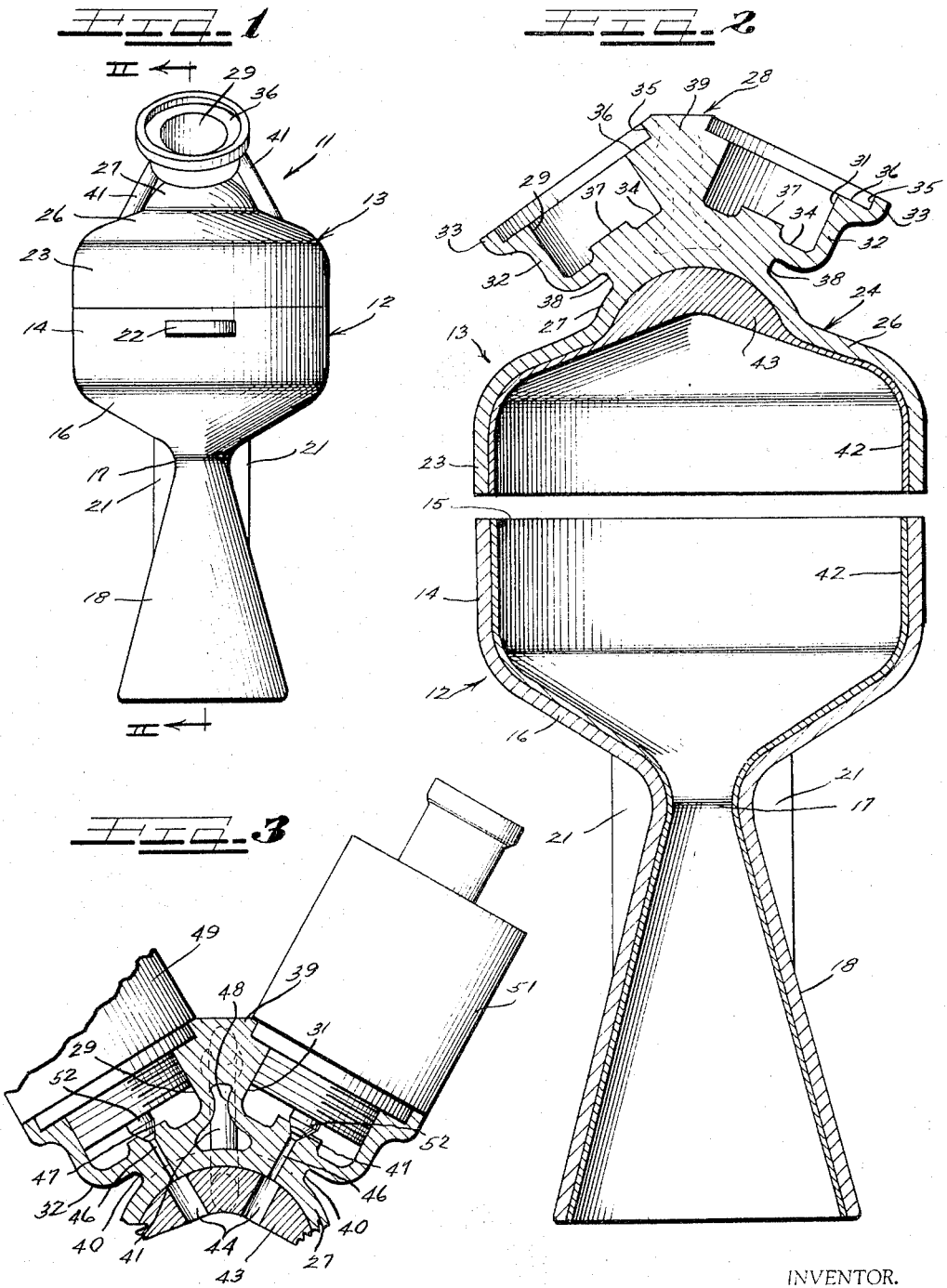
INVENTOR.
DONALD P. SHILEY
BY
ATTORNEYS

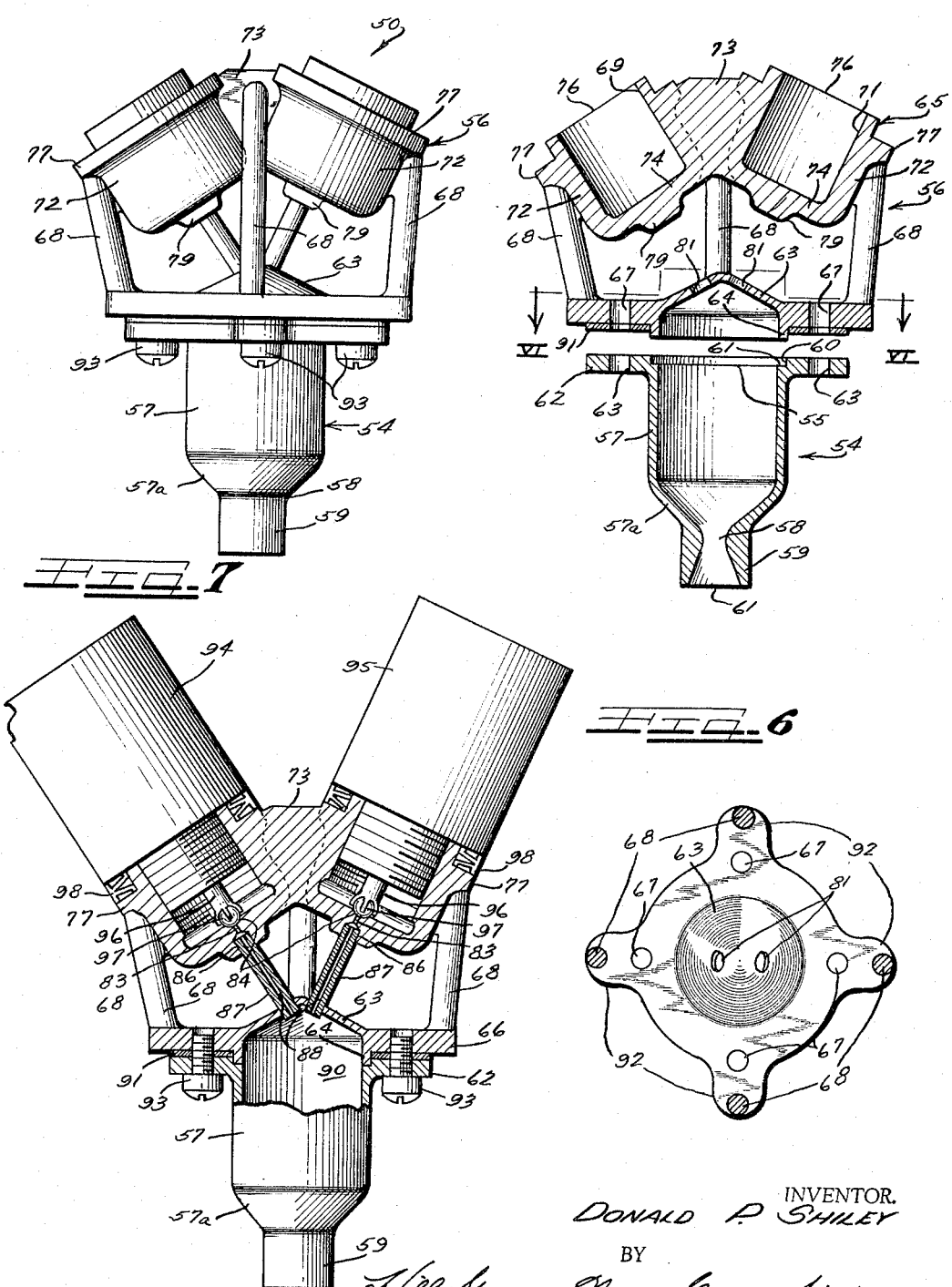

United States Patent Office 3,279,190
Patented Oct. 18, 1966

3,279,190
INVESTMENT CAST ROCKET
Donald P. Shiley, El Segundo, Calif., assignor to
TRW Inc., a corporation of Ohio
Filed July 27, 1962, Ser. No. 212,881
7 Claims. (Cl. 60—258)

This invention generally relates to rocket motors which are selectively operated for a desired time and more specifically this invention deals with chemical rocket motors and the method of making chemical rocket motors that receive thrust gas producing fuels and oxidizers for regulated periods of time.

The invention will hereinafter be specifically described as embodied in small rocket motors for controlling the attitude of orbiting vehicles relative to the earth, but it should be understood that motors of this invention are generally useful for any type of vehicle.

In accordance with this invention, a plurality of small rocket motors are positioned around the periphery of a satellite. These motors are selectively energized for desired duration, from signals sent from earth bound equipment or from the cockpit of the satellite, to correct or change the attitude of the orbiting satellite relative to the earth. Each rocket motor is equipped with simultaneously operated fuel and oxidizer injectors that delivers the correct proportions of hypergolic reacting fuel and oxidizer into the combustion chamber of the rocket motor upon receipt of the control signal.

Heat transferred from the rocket body to the fuel and oxidizer injectors causes vaporization of the propellant and the injector valves to stick. Vaporization of the propellant increases the minimum amount of impulse that is available which results in overcontrol and "hunting" of the space vehicle. When the injector valves stick fuel or oxidizer are wasted as well as the inaccurate control of the space vehicle.

Further, attitude rocket motors have repeated high temperature and pressure firings which cause the rocket motors to expand and contract. The stresses on the rocket motors, from this expansion and contraction, results in the rocket motors weakening and eventually cracking and rupturing. Materials, that are lightweight and capable of withstanding the erosion from the high temperature combustion gases, have not been successful in withstanding the stress encountered.

The present invention eliminates the problems of heat transferring from the rocket body to the fuel and oxidizer injectors and high stress relieving of attitude rocket motors by providing a two piece investment cast rocket motor having a heat barrier or heat dam between the rocket motor body and the fuel and oxidizer injectors.

While the rocket motors as hereinafter specifically described are quite small and are used for attitude control of space vehicles, it is obvious that larger motors could be used for propelling a rocket vehicle without departing from the principles of this invention.

It is therefore an object of this invention to provide a method of manufacturing investment cast attitude control rockets that are selectively actuated for desired periods of time.

Another object of this invention is to provide a method of making chemical reacting investment cast rocket motors with fuel and oxidizer injectors thereon that are separated from the rocket body by a heat barrier or heat dam.

It is still another object of the present invention to provide a two-piece investment cast rocket motor having "on-off" valve controlled oxidizer and fuel injectors mounted thereon and separated therefrom by a heat barrier or heat dam, and the method of manufacturing said rocket motor.

It is still another object of the present invention to provide an attitude rocket motor by investment casting the rocket motor into two sections—a head section and a tail section.

Other and further objects of this invention will be apparent to those skilled in the art from the following detailed description of the annexed sheets of drawings, which by way of preferred examples only, illustrates two embodiments of the invention.

On the drawings:

FIGURE 1 is a side elevational view of the attitude rocket of the present invention minus solenoid valves therein;

FIGURE 2 is a cross-sectional view of the head and tail section of the attitude rocket motors of the present invention prior to machining and assembly thereof, as shown in FIGURE 1;

FIGURE 3 is a partial cross-section of the finished head section of the present invention with solenoid valves mounted therein;

FIGURE 4 is a side elevational view of another attitude rocket of the present invention minus solenoid valves therein;

FIGURE 5 is a cross-sectional view of the head section and the tail section of the rocket motor of FIGURE 4, prior to the machining and assembling thereof;

FIGURE 6 is a top elevational view taken along the lines VI—VI of FIGURE 5; and

FIGURE 7 is a partial cross-sectional view of the assembled and machined attitude rocket motor of the present invention with the solenoid valves therein.

As shown on the drawings:

In accordance with this invention, attitude rockets are fed hypergolic fuel such as hydrazine or hydrazine mixtures, and an oxidizer, such as red fuming nitric acid or $N_2O_4$. A plurality of the attitude rockets are mounted on a space vehicle to control the attitude of the space vehicle and the fuel and oxidizer used to propel the main rocket of the space vehicle may be the same as that used in the attitude control rockets.

As is illustrated in FIGURES 1 and 2, an attitude rocket motor 11 of the present invention is investment cast in two parts—a tail section 12 and a head section 13. The two-piece assembly of the rocket motor allows the motor to be assembled with ease and with a high degree of accuracy. Also, the two-piece arrangement provides the rocket motor with a high strength to weight ratio and reduces the weight of the rocket motor by eliminating unnecessary auxiliary fastening and attaching means.

Each piece, the tail section and the head section, is investment cast to provide the rocket motor with a minimum of stress relieving from repetitive firing of the rocket motor. Investment casting provides a wide selection of materials that may be cast and allows the use of materials with high corrosion resistant properties. Further, investment casting provides close tolerances and a smooth finish after the casting operation, so that the rocket motor requires very little finishing after being investment cast.

The rocket motor tail section 12 has a cylindrical chamber wall 14 defining an open circular end 15 and having a conical or tapered end wall 16 opposite the open end 15. The conical wall 16 converges to a throat 17 and then diverges to define an exhaust nozzle 18 with an exit opening 19 larger than the throat 17. The exhaust nozzle at the throat area may be reinforced by ribs 21 and the cylindrical chamber wall 14 may contain means 22, on the outer surface thereof, for mounting the attitude rocket onto a space vehicle.

The head section 13 is inverted cup-shaped with a cylindrical wall 23, equal in diameter to the cylindrical chamber wall 14, in order to form a continuous wall when joined thereto. The head section has an end wall 24 having a conical or tapered wall portion 26 convering to a central convex dome 27. Extending from the convex dome 27 and integral therewith is a dual injector mounting boss 28.

The mounting boss 28 defines a cylindrical oxidizer valve cavity 29 and a cylindrical fuel valve cavity 31. Each valve cavity is inclined at a predetermined angle to the rocket motor axis, so that the center line through the valve cavity 29 intersects with the center line through the valve cavity 31 at a predetermined point within the rocket motor combustion chamber. Each valve cavity, 29 and 31, is in a cup-like cylindrical housing 32 that has an open interconnected stepped end 33 defining a counterbore 35 and a shoulder 36. The cylindrical valve cavities extend from the open end to a circular base 34. From the bases 34, there are protrusions or nipples 47 extending centrally into the valve cavities and merged circular necks 38 extending away from the bases and concentric with the nipples 37. The necks 38 are integral with the dome 27 and the necks 38 and valve housings 32 are interconnected at the top of the dome 27 by an integral central web 39.

The mounting boss 28 is further supported by two integral support rods 41 spaced 180° apart and connected to the top of the web 39 and tapering wall 26.

The head section 13 is investment cast in one piece as is the tail section 12. Conventional lost wax, frozen mercury pattern and the like investment casting methods are used wherein fugitive patterns of the head section and tail section are invested in refractory molds and then removed from the mold by heat, solvents or the like.

After investment casting each piece of the rocket motor of the present invention, the entire interior of each section is coated with an insulative "Rockide" coating 42. The "Rockide" is a substantially pure silicon refractory and substantially fills the area 43 in the head section under the convex dome 27. This extra-thick "Rockide" coating, under the convex dome 27, provides an additional heat barrier means that prevents the transfer of heat from the rocket motor combustion chamber to the mounting boss 28.

As is best illustrated by FIGURE 3, the Rockide portion 43 is bored to define two delivery passageways 44, each aligned with the center line of each valve cavity. The head section may be brazed to the tail section so that the tail wall 14 forms a continuous wall with the head wall 23 to define a combustion chamber. However, the remainder of the finishing operation may be accomplished either before or after the head section is brazed to the tail section.

The nipples 37 and the necks 38 of the valve cavity, and the wall 27 are bored to provide two delivery passageways 46 that connect with the delivery passageways 44 and are concentric therewith. The delivery passageways 44 and 46 may be separate tubular insert means, if desired. Then the inner surface of the nipples 37 are bored to define a frusto-conical valve seat 47 whose frusto-apex is concentric with the passageway 46.

Thereafter the valve cavities are threaded and the interconnection 39, between each valve assembly and neck portion, is machined at 48 to provide two complete cylindrical necks 40 extending from the convex wall 27 and maintain interconnection between the valve housing 32 at the side walls thereof.

It is of course understood that the particular sequence in finishing the rocket motor is not critical and may be varied as desired.

The delivery passageways 44 and 46 of each valve assembly are fixed at a particular angle so that the impingement area and angle of feed are accurately maintained. The area and angle of feed is important in providing a complete combustion of the oxidizer and fuel. This is also true of the dimensions of the passageways or tubular conduits for both the oxidizer and fuel injector. These conduits are of a fixed dimension and preferably have a $L/D$ ratio of 5:1 up to 15:1 in order to minimize the volume between the combustion chamber and valve cavities. The delivery passageways of the oxidizer injector 49 are of a larger dimension than the delivery passageways for the fuel injector 51. Thus, when the rocket motor is operated with an oxidizer, such as nitrogen peroxide, and with a fuel, such as a mixture composed of 50% by weight of hydrazine and 50% by weight of unsymmetrical dimethyl hydrazine, the correct reacting hypergolic mixture for the combustion chamber will be usually 1.3 to 2.0 parts by weight of oxidizer for each one part by weight of fuel. In such instances, the tubular delivery means will be sized to deliver the correct ratios of fuel and oxidizer.

As illustrated by FIGURES 1–3 the attitude rocket of the present invention is manufactured by first investment casting the head section 13 and the tail section 12 separately. The head section and the tail section are internally coated with Rockide with the head section having a thick Rockide coating 43. The thick Rockide coating is bored to define two delivery passageways 44. Before or after brazing the head section to the tail section, two passageways 46 are drilled concentric with the passages 44, through the nipples 37, the necks 38 and the convex wall 27 to communicate the valve cavities with the rocket motor combustion chamber. After boring passageways 46 and 44 frusto-conical seats 47 are formed in the nipples 37. Then the entire interconnecting portion 39 is machined to define the cylindrical necks 40 and space 48 as illustrated in FIGURE 3.

Finally, each valve cavity is then threaded and the entire head section is brazed to the tail section, if not brazed before to form a substantially continuous wall defining the combustion chamber. Into the threaded valve cavities are threaded the oxidizer solenoid valve injector 49 and the fuel solenoid valve injector 51. The fuel and oxidizer solenoid valve injectors have valve stems 52 which sits in the valve seats 47 of the nipples 37. The valve 52 is of the "on-off" type and is not a metering valve.

The space 48 and the necks 40 provide a heat barrier or heat dam between the rocket body and the valve assembly. Also, the insulating coating of Rockide provides a heat barrier against the transfer of heat from the combustion chamber to the valve assembly. Heating of the valves causes vaporization of the propellant and increases the amount of impulse available; causes the valve to stick; and causes the solenoid core to operate improperly. All of which result in "over-control" and "hunting" of the space vehicle. Therefore, the present invention provides, as illustrated by FIGURES 1–3, a rocket motor and a method of forming a rocket motor that affords extremely accurate delivery of the necessary small amount of impulse that is needed to correct the attitude of a space vehicle.

Referring to FIGURES 4 through 7 there is shown another embodiment of the present invention. FIGURE 4 illustrates a two-piece investment cast rocket motor 50 having a tail section 54 and a head section 56. As is best illustrated by FIGURE 5, the rocket motor of the present invention is investment cast in two separate sections, The tail section 54 having a tubular tail 57 defining an open end 55 and a conical or tapered end wall 57a opposite the open end 55. The conical wall 57a converges to form a throat 58 and then interiorly diverges to define an exhaust nozzle 59 with an exit opening 61 larger than the throat 58. Extending from the open end 55, of the tubular wall 57, is an annular radial flange 62 defining four holes 63 therethrough spaced approximately 90° apart. The flange 62 is cast to provide a counterbore 60 and an annular shoulder 61.

The head section 56 has a cylindrical head wall 64 that is formed to inter fit in the counterbore 60 and abut the shoulder 61 and form a continuous wall with the wall 57 when the head portion is connected to the body section; a radial annular flange 66 with four holes 67 therethrough spaced approximately 90° apart; a converging conical end wall 63; a mounting boss 65; and four long and thin rigidifying braces 68.

The head section is cast to define two cylindrical valve cavities 69 and 71 having incomplete cylindrical housings 72 interconnected at 73 to each other, transverse base walls 74, open ends 76, and annular radial shoulders 77 extending from the outer surface of the cylindrical housings adjacent the open ends. Extending from the outer surface of the base walls 74, away from the valve cavities, are protrusions or nipples 79. The valve cavities 69 and 71 being spaced from the walls 63 by the four long and thin rigidifying braces 68.

Bored through or cast in the wall 63 are two holes 81 spaced approximately 180° apart. The holes 81 are concentric with the nipples 79. Bored through the nipples are fluid passageways 83, best illustrated by FIGURE 7. The passages 83, are counterbored to provide a semispherical valve seat 84 in each valve cavity and a cavity 86 in each nipple 79.

Then as is illustrated in FIGURES 4 and 7, delivery tubes 87 are inserted in the nipple cavities 86 and through the holes 81. Each delivery tube defines a passageway 88 therethrough that simultaneously deliver fuel and oxidizer from their respective valve cavities to the rocket motor combustion chamber 90 at a predetermined rate and angle. The delivery tube or neck 87, in this embodiment of the present invention, is not integral with the head section. The delivery tube has such a small dimension that the head section cannot be adequately cast therewith and delivery passages 88 are bored after the investment casting of the head section.

An insulating washer 91 with corresponding holes fits snugly around the head wall 64 on the flange 66. The flange 66, as is shown in FIGURE 6, has formed thereon four nipples 92 extending approximately 90° apart and radially aligned with the holes 67. Extending from the ends of the nipples 92 are four rigidifying braces 68. The braces 68 maintain the mounting boss 65 at a rigid and fixed position away from the rocket motor body and are long and thin to provide maximum heat dissipating area.

The head section is fastened to the body section by inserting the head wall 64 into the body counterbore on the shoulder 61 with the insulating washer being between the flange 62 and the flange 66. The delivery tubes are inserted in the head delivery apertures 81 communicating with the combustion chamber 91 and fastened thereto. Then appropriate fastening means 93, are inserted through the holes 63 and 67 to fasten the head section to the tail section.

The interior of the valve cavities are threaded and threaded respectively into the valve cavities 69 and 71 are solenoid valve oxidizer injector 94 and solenoid fuel valve injector 95. Each injector has a valve 96 utilizing a sapphire ball 97 which sets in the valve seat 84. An annular heat seal 98 is placed between the solenoid and the valve cavity shoulder 77.

To insure the lowest possible heat transfer, between the rocket body and the fuel and oxidizer valve cavities, the rigidifying bars 68 are long and narrow to provide for the maximum heat dissipating area; heat insulation is provided by insulating seals 91 and 98; and the narrow necks or the delivery tubes 87 connecting the valve assemblies with the rocket combustion chamber should be thin and the delivery passageways should have the lowest possible $L/D$ ratio.

The $L/D$ ratio of the delivery tubes is desirable as being 5:1 up to 15:1 and the outer dimensions of the neck should only be large enough to hold pressure in the passageway. This pressure may be up to 1000 p.s.i., and for stainless steel, the thickness may be from "0.008 to 0.08." The long thin neck portions as well as the long rigidifying brace portions are exposed to the atmosphere and therefore allow readily for the dissipation of heat. Also, the long thin passages minimize the volume between the valve assembly and the combustion chamber.

The valve injectors are of the "on-off" type, and are either fully open or fully closed and the rocket motor delivers the rated thrust only for the duration in which the injectors are open. The oxidizing and fuel injectors are spaced from the rocket motor thereby providing a heat barrier or heat dam between the injectors and rocket motor. The heat dam or heat barrier prevents the fuel and the oxidizer for vaporizing and also prevents heat distortion of the solenoid operated valve injectors.

From the above description it is therefore understood that this invention provides an attitude rocket motor that minimizes stress relieving on repeated firings, has a high strength to weight ratio, and makes a wider selection of materials to be cast available. Further, the rockets of the present invention provides a heat barrier or dam for the individual valve injectors on each rocket.

I claim as my invention:

1. A two piece rocket motor having a combustion chamber and an exhaust nozzle comprising:
   an investment cast one piece head section,
   said head section having
       a mounting boss defining a fuel cavity for mounting a fuel injector valve therein,
       an end feed wall, and
       a heat conduction barrier including means for supporting the mounting boss a spaced distance from said end feed wall and having a relatively small cross-sectional area to provide a low conduction path between the rocket motor body and the fuel cavity,
   an investment cast one piece tail section affixed to said head section, and
   said tail section defining the rocket motor nozzle and the combustion chamber with said head section whereby the rocket motor is provided with relatively high strength to weight ratio and a high degree of structural integrity.

2. A two piece rocket motor having a combustion chamber and an exhaust nozzle comprising:
   a one piece investment cast head section,
   said head section having
       a mounting boss defining a fuel cavity for mounting a fuel injector valve therein,
       an end feed wall,
       a heat conduction barrier including a plurality of rigidifying braces supporting the mounting boss a spaced distance away from said end feed wall and having a relatively small cross-sectional area to provide a low heat conduction path between the rocket motor body and the fuel cavity,
       said rigidifying braces being long and thin to present the maximum area for heat dissipation, and
       a neck defining a fuel delivery passageway communicating the fuel valve cavity with the rocket motor combustion chamber,
   an investment cast one piece tail section affixed to said head section, and
   said tail section defining the rocket motor nozzle and the combustion chamber with said head section whereby the rocket motor is provided with relatively high strength to weight ratio and a high degree of structural integrity.

3. A two piece rocket motor having a combustion chamber and an exhaust nozzle comprising:
- a one piece investment cast head section,
- said head section having
    - a mounting boss defining fuel and oxidizer cavities for mounting fuel and oxidizer injector valves respectively,
    - an end feed wall,
    - a heat conduction barrier including means for supporting said mounting boss a spaced distance from said end feed wall and having a relatively small cross-sectional area to provide a low heat conduction path between the mounting boss and the end feed wall, and
    - passaged means communicating the fuel and oxidizer cavities with the end feed wall and rocket motor combustion chamber,
- an investment cast one piece tail section affixed to said head section, and
- said tail section defining the rocket motor nozzle and the combustion chamber with said head section whereby the rocket motor is provided with relatively high strength to weight ratio and a high degree of structural integrity.

4. A two piece rocket motor having a combustion chamber and an exhaust nozzle comprising:
- an investment cast one piece head section,
- said head section having
    - a mounting boss defining fuel and oxidizer cavities for mounting fuel and oxidizer injector valves, respectively,
    - an end feed wall, and
    - a heat conduction barrier including means for supporting said mounting boss a spaced distance from said end feed wall and having a relatively small cross-sectional area to provide a low heat conduction path between the mounting boss and the end feed wall,
- an investment cast one piece tail section affixed to said head section, and
- said tail section defining the rocket motor nozzle and the combustion chamber with said head section,
- two separate necks connecting the mounting boss to the head section end wall, and
- said necks defining passages communicating the fuel and oxidizer cavities with the combustion chamber to impinge fuel and oxidizer in reacting quantities into the combustion chamber whereby the rocket motor is provided with relatively high strength to weight ratio and a high degree of structural integrity.

5. A rocket motor for controlling the attitude of space vehicles comprising:
- an investment cast one piece tail section defining an exhaust nozzle,
- an investment cast one piece head section connected to said tail section and having a wall defining a combustion chamber therewith,
- said head section having integral rigidifying braces and an integral mounting boss,
- two valve cavities defined by said mounting boss,
- a heat conduction barrier including means for supporting said mounting boss a spaced distance from said head section wall and having a relatively small cross-sectional area to provide a low heat conduction path between the mounting boss and the head section wall, and
- means communicating each valve cavity with said combustion chamber for simultaneously delivering fuel and oxidizer into said combustion chamber at a predetermined rate and ratio whereby said fuel and oxidizer cause a hypergolic reaction and produce a controlled minimum impulse bit.

6. A rocket motor for controlling the attitude of space vehicles comprising:
- an investment cast one piece tail section defining an exhaust nozzle,
- an investment cast one piece head section connected to said tail section and having a wall defining a combustion chamber therewith,
- said head section having an integral mounting boss,
- a fuel valve cavity defined by said mounting boss,
- an oxidizer valve cavity defined by said mounting boss,
- a plurality of integral rigidifying braces connected to said wall and supporting said mounting boss a spaced distance therefrom,
    - said rigidifying braces being long and thin to present the maximum area for heat dissipation,
- an oxidizer neck connecting the oxidizer valve cavity with said housing,
- said oxidizer neck defining an oxidizer delivery passageway of a predetermined size,
- a fuel neck connecting the fuel valve cavity with said housing,
- said fuel neck defining a fuel delivery passageway of a predetermined size,
- said fuel and oxidizer passageways communicating the oxidizer and fuel valve assemblies with said combustion chamber for delivering a hypergolic fuel and oxidizer in impinging relation within said combustion chamber,
- said fuel and oxidizer passageways being sized to deliver the correct rate and ratio of oxidizer and fuel to said combustion chamber for effecting a complete hypergolic reaction therebetween,
- said fuel and oxidizer passageways having a $L/D$ ratio of between 5:1 to 15:1 to minimize the volume between the valve cavities and the combustion chamber,
- an on-off solenoid operated valve mounted in each of the fuel and oxidizer valve cavities,
- said rigidifying braces, said oxidizer neck, and said fuel neck having a relatively small cross-sectional area to provide a low heat conduction path between said mounting boss and said wall whereby fuel and oxidizer may be accurately delivered to the combustion chamber for providing the attitude rocket with a minimum impulse bit.

7. A rocket motor for controlling the attitude of space vehicles comprising:
- an investiment cast one piece tail section defining an exhaust nozzle,
- an investment cast one piece head section connected to said tail section and having a wall defining a combustion chamber therewith,
- said head section having an integral mounting boss,
- a heat conduction barrier including means for supporting said mounting boss a spaced distance from said head section wall and having a relatively small cross-sectional area to provide a low heat conduction path between the mounting boss and the head section wall,
- two valve cavities defined by said mounting boss,
- means defining a fuel delivery passageway for delivering fuel from one valve cavity to said combustion chamber,
- means defining an oxidizer delivery passageway for delivering oxidizer to said combustion chamber from said other valve cavity,
- valve means in each valve cavity for opening and closing the passageway communicating with each valve cavity, and
- each of said fuel and oxidizer delivery passageway being of a predetermined size for simultaneously delivering fuel and oxidizer into said combustion chamber at a predetermined rate and ratio whereby said fuel and oxidizer cause a hypergolic reaction and produce a controlled minimum impulse bit.

References Cited by the Examiner

UNITED STATES PATENTS

| | | | |
|---|---|---|---|
| 2,706,382 | 4/1955 | Logan et al. | 60—35.6 |
| 2,741,817 | 4/1956 | Wilkins | 22—196 X |
| 2,793,412 | 5/1957 | Lashbrook | 22—196 |
| 2,906,091 | 9/1959 | Kretschmer | 60—35.6 |
| 2,951,336 | 9/1960 | Mueller | 60—35.6 |
| 2,956,334 | 10/1960 | Stewart | 29—157 |
| 2,958,183 | 11/1960 | Singelmann | 60—35.6 |
| 3,015,138 | 1/1962 | Watts | 22—196 X |
| 3,035,333 | 5/1962 | Baehr | 29—157.3 |
| 3,088,406 | 5/1963 | Horner | 60—35.6 X |
| 3,100,963 | 8/1963 | Michel | 60—35.6 |
| 3,178,884 | 4/1965 | Boardman | 60—35.6 |

MARK NEWMAN, *Primary Examiner*.

ABRAM BLUM, SAMUEL LEVINE, *Examiners*.

S. N. GARBER, D. HART, *Assistant Examiners*.